UNITED STATES PATENT OFFICE.

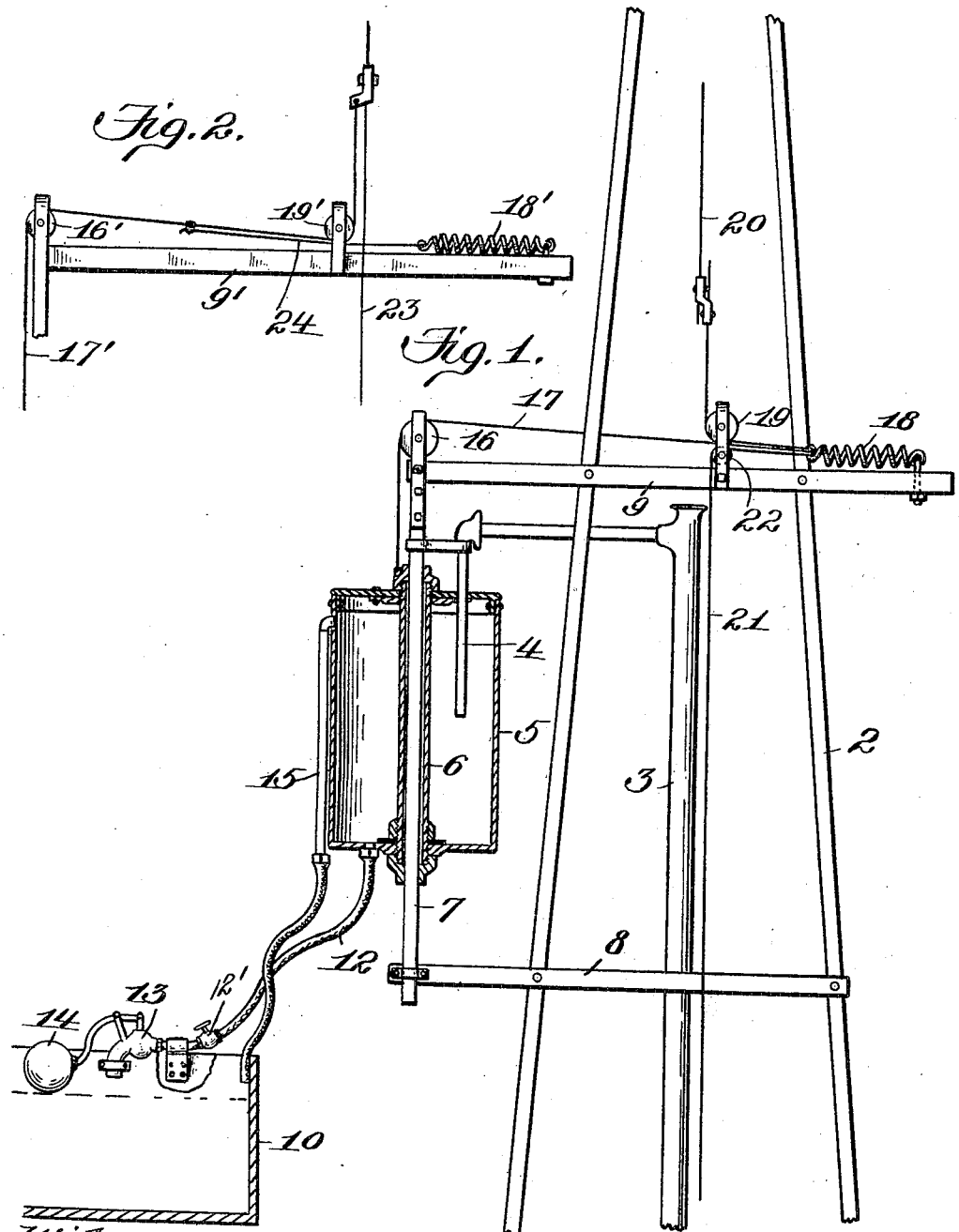

HERMAN A. KRICKE, OF CROWS LANDING, CALIFORNIA.

WINDMILL-REGULATOR.

No. 838,425.  Specification of Letters Patent.  Patented Dec. 11, 1906.

Application filed April 18, 1906. Serial No. 312,479.

*To all whom it may concern:*

Be it known that I, HERMAN A. KRICKE, a citizen of the United States, residing at Crows Landing, in the county of Stanislaus and State of California, have invented new and useful Improvements in Windmill-Regulators, of which the following is a specification.

This invention relates to windmill-regulators, the object of the invention being to provide an effective apparatus of this character which is adapted to automatically stop the mill when a tank receiving water from a pump actuated by said windmill is filled or has received a predetermined amount of water.

In the drawings accompanying and forming a part of this specification I show certain forms of embodiment of the invention, which to enable those skilled in the art to practice said invention I will set forth in detail in the following description, while the novelty of the invention will be included in the claims succeeding said description.

Referring to said drawings, Figure 1 is a sectional elevation of a part of a windmill and a governor including my invention. Fig. 2 is a side view of part of the mill, showing a slight modification of the connections.

Similar characters refer to like parts throughout the views.

In Fig. 1 I have shown parts of a windmill of known construction, the operative mechanism, including the regulator, being sustained by framework, (denoted in a general way by 2.) A pump is shown at 3, said pump having near its head a laterally-extending discharge-pipe 4 of substantially inverted-L shape. The vertical branch of this discharge-pipe leads into a vessel or can, as 5, through the top thereof. This vessel or can may be of any size, shape, or material, these details being immaterial. Extending entirely through the vessel from top to bottom thereof is a tube 6, the terminal ends of which are connected in some suitable watertight manner to the top and bottom of the vessel. The vessel has an up-and-down movement upon the vertically-disposed rod 7, extending between and suitably fastened to the cross-bars 8 and 9 of the framework. This rod 7 is shown as extending through the tube 6, the two parts having a non-rotative relation, whereby as the vessel 5 descends and ascends it cannot turn on the rod. This relation may be secured in any desirable way. For example and as shown the rod may be square and the interior of the tube may be correspondingly shaped. From what has been hereinbefore stated it is believed that it will be understood that water is delivered by the pump 3 into the vessel 5, the latter in turn supplying a tank, as 10. I have shown as leading from the bottom of the vessel 5 a discharge-pipe, as 12, preferably of some suitable flexible material, such as rubber hose. This pipe is provided with a valve, as 13, operated by a float 14, the parts being so related that when the water in the tank has reached the desired level the float will serve to operate the valve 13 so as to cut off the further supply by the pipe 12 of water to the tank 10. Said pipe 12 is equipped with a valve or cock, as 12′, by which the amount of water flowing from the tank 5 can be regulated for the purpose of governing the speed of the mill. In addition to the discharge-pipe 12 the vessel 5 is provided with an overflow-pipe, as 15, leading from said vessel near the top thereof, said pipe 15 consisting of rigid and flexible sections, the lower section or the one which empties directly into the tank 10 being flexible. Supported by a bracket or bearing carried by the top of the rod 7 is an antifriction roller or pulley 16, around which is passed the cord 17, the term "cord" being used in a broad sense to include a chain, cable, or equivalent means. This cord 17 is connected at one end to the top of the vessel 5 and at the other extremity to one end of the spring 18, connected at its opposite end in some convenient manner to the cross-bar 9. The cord 17 passes between the pulley 16 and the spring 18 under a pulley 19, supported by a suitable bearing upon the cross-bar 9. The usual cord for controlling the windmill by hand is represented as composed of two sections, the upper section 20 and the lower section 21, both sections of which are connected with the spring 18 at substantially the place at which the cord 17 is connected therewith. The two sections of the controlling-cord extend between the pulley 19 and a coöperating pulley 22, supported immediately below the pulley 19.

It will be assumed that the vessel 5 is up and empty and that the wind mill is in action to operate the pump 21 to cause said pump to supply water to the vessel 5. When the vessel 5 is filled, it will descend, thereby stretching the spring 18 and permitting the upper section 20 of the controlling-cord to be paid off or to be elevated, this being due to the spring connected to the windmill, but which is not shown. When the cord 20 is freed by the stretching of the spring 18 under the action of the descending filled vessel 5, the windmill-spring will throw the windmill out of the wind and will stop the mill. When a certain amount of water has been delivered from the vessel 5, the spring 18 by contracting raises the vessel 5 and draws down the upper section 20 of the controlling-cord, so as to pull or draw the windmill into the wind. The foregoing detailed description applies particularly to a construction adapted especially for windmills which are thrown out of the wind by releasing or paying off a controlling-cord. In this particular construction the spring 18 counterbalances what I have termed the "windmill-spring," or that which is common in windmills for throwing the same out of the wind. It will be evident that the windmill can be thrown out of the wind by hand by drawing down upon the lower section 20 of the controlling-cord.

In Fig. 2 I have shown a modification wherein the windmill is pulled directly out of the wind. In this figure I have not shown the vessel, as it is the same in construction and mode of operation as that shown in Fig. 1; nor, for the same reason, have I shown the pump and certain other parts in said Fig. 2. In other words, in the latter figure I have only shown the cord connections. In this Fig. 2 the reference character 17' denotes a connecting-cord practically the equivalent of the cord 17, hereinbefore described, and which at its lower end is connected with the top of the governing vessel. This cord 17' is passed around horizontally-alined pulleys 16' and 19', is continued above the pulley 19', and is suitably connected above said pulley 19' with the controlling-cord 23. A spring is shown at 18' connected at one end with the cross beam or bar 9' and at the other end with a cord 24, which cord 24 extends under the pulley 19' and is shown as connected with the cord 17' between the pulleys 16' and 19'. When the cord 17' is drawn down by the descent of a vessel, such as 5, hereinbefore described, the spring 18' is stretched and the cord 23 is drawn downward, so as to pull the windmill out of the wind. When such vessel is emptied, the spring 18' returns the vessel to its original position by drawing on the cord 17', so that the windmill can again be put into the wind.

What I claim is—

1. In a windmill-regulator, the combination of a water-containing governing vessel mounted for rising-and-falling motion, a tube extending through the vessel vertically thereof, and a vertically-disposed rod constituting a guide for the vessel, extending through said tube.

2. In a windmill-regulator, the combination of a water-containing governing vessel mounted for rising-and-falling motion, a tube extending through the vessel vertically thereof, and a vertically-disposed rod constituting a guide for the vessel, extending through said tube, the tube and rod being non-rotatively related.

3. In a windmill-regulator, the combination of a governing vessel to contain water, a tube extending through the vessel from top to bottom thereof, a rod constituting a guide for the vessel, the rod being rectangular in cross-section and the opening through the tube being correspondingly shaped to prevent rotation of the vessel on the rod, a discharge-pipe leading from the vessel and an overflow-pipe also leading from the vessel at a point above the discharge-pipe.

4. In a windmill-regulator, the combination of a water-containing governing vessel mounted for rising-and-falling motion, a tube extending through the vessel vertically thereof, a vertically-disposed rod extending through said tube and constituting a guide for said vessel, and a pump for delivering water into said vessel, and a discharge-pipe for water leading from said vessel.

In testimony whereof I have hereunto set my hand in presence of two subscribing witnesses.

HERMAN A. KRICKE.

Witnesses:
GEO. A. WHITTY,
GEO. H. CROW.